(12) United States Patent
Yotsumoto et al.

(10) Patent No.: US 10,738,947 B2
(45) Date of Patent: Aug. 11, 2020

(54) BULB-TYPE LIGHT SOURCE APPARATUS AND LIGHT GUIDE MEMBER

(71) Applicant: SONY CORPORATION, Tokyo (JP)

(72) Inventors: Naoki Yotsumoto, Tokyo (JP); Masashi Torimoto, Saitama (JP); Masaki Ohno, Kanagawa (JP); Takashi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/328,292

(22) PCT Filed: Jul. 31, 2015

(86) PCT No.: PCT/JP2015/003872
§ 371 (c)(1),
(2) Date: Jan. 23, 2017

(87) PCT Pub. No.: WO2016/035253
PCT Pub. Date: Mar. 10, 2016

(65) Prior Publication Data
US 2017/0211750 A1 Jul. 27, 2017

(30) Foreign Application Priority Data
Sep. 2, 2014 (JP) .................................. 2014-177701

(51) Int. Cl.
F21K 9/237 (2016.01)
F21K 9/66 (2016.01)
(Continued)

(52) U.S. Cl.
CPC .............. *F21K 9/237* (2016.08); *F21K 9/232* (2016.08); *F21K 9/238* (2016.08); *F21K 9/61* (2016.08);
(Continued)

(58) Field of Classification Search
CPC ... F21K 9/237; F21K 9/61; F21K 9/66; F21K 9/238; F21K 9/232; F21K 9/69;
(Continued)

(56) References Cited

U.S. PATENT DOCUMENTS 7,604,378 B2 10/2009 Wolf et al.
2006/0044832 A1* 3/2006 Feng .................... G02B 6/0038
362/615
(Continued)

FOREIGN PATENT DOCUMENTS

DE 202007009272 11/2007
EP 2392953 12/2011
(Continued)

OTHER PUBLICATIONS

International Search Report prepared by the Japan Patent Office dated Nov. 27, 2015, for International Application No. PCT/JP2015/003872.
(Continued)

*Primary Examiner* — Britt D Hanley
*Assistant Examiner* — Jessica M Apenteng
(74) *Attorney, Agent, or Firm* — Sheridan Ross P.C.

(57) ABSTRACT

A bulb-type light source apparatus includes a light source and a light guide member. The light source is provided annularly. The light guide member includes an outer surface, a light-incident end surface opposing the light source, and an optical pattern portion configured to emit, from the outer surface, light that enters from the light-incident end surface.

19 Claims, 9 Drawing Sheets

(51) Int. Cl.

| | |
|---|---|
| *F21K 9/232* | (2016.01) |
| *F21V 3/02* | (2006.01) |
| *F21K 9/61* | (2016.01) |
| *F21V 33/00* | (2006.01) |
| *F21S 2/00* | (2016.01) |
| *F21K 9/69* | (2016.01) |
| *F21V 29/70* | (2015.01) |
| *F21K 9/238* | (2016.01) |
| *F21V 3/00* | (2015.01) |
| *F21V 17/12* | (2006.01) |
| *F21V 8/00* | (2006.01) |
| *H04R 1/02* | (2006.01) |
| *F21K 9/68* | (2016.01) |
| *F21V 7/04* | (2006.01) |
| *F21Y 101/00* | (2016.01) |
| *F21Y 103/33* | (2016.01) |
| *F21Y 105/18* | (2016.01) |
| *F21Y 115/10* | (2016.01) |

(52) U.S. Cl.
CPC ................ *F21K 9/66* (2016.08); *F21K 9/69* (2016.08); *F21S 2/00* (2013.01); *F21V 3/00* (2013.01); *F21V 3/02* (2013.01); *F21V 17/12* (2013.01); *F21V 29/70* (2015.01); *F21V 33/0056* (2013.01); *G02B 6/0096* (2013.01); *H04R 1/028* (2013.01); *F21K 9/68* (2016.08); *F21V 7/041* (2013.01); *F21Y 2101/00* (2013.01); *F21Y 2103/33* (2016.08); *F21Y 2105/18* (2016.08); *F21Y 2115/10* (2016.08)

(58) Field of Classification Search
CPC . F21K 9/68; F21V 29/70; F21V 7/041; F21V 3/00; F21V 3/02; F21V 17/12; F21V 33/0056; F21Y 2115/10; F21Y 2101/00; F21Y 2105/18; F21Y 2103/33; F21S 2/00; G02B 6/0096; H04R 1/028
USPC .................................................. 362/296.01
See application file for complete search history.

(56) References Cited

U.S. PATENT DOCUMENTS

| | | | | |
|---|---|---|---|---|
| 2008/0225510 | A1* | 9/2008 | Rocha | F21V 33/0056 362/86 |
| 2011/0090427 | A1* | 4/2011 | Ohue | G02B 6/0038 349/65 |
| 2011/0101861 | A1* | 5/2011 | Yoo | F21V 3/02 315/35 |
| 2011/0215345 | A1 | 9/2011 | Tarsa et al. | |
| 2011/0309735 | A1* | 12/2011 | Parker | F21V 3/02 313/46 |
| 2012/0307513 | A1 | 12/2012 | Li et al. | |
| 2014/0063815 | A1 | 3/2014 | Lin | |
| 2014/0092580 | A1* | 4/2014 | McCollum | F21V 29/77 362/84 |
| 2014/0268802 | A1* | 9/2014 | Sun | F21V 5/04 362/294 |
| 2014/0313741 | A1* | 10/2014 | Sun | F21K 9/52 362/311.02 |

FOREIGN PATENT DOCUMENTS

| | | |
|---|---|---|
| JP | 2007-194132 A | 8/2007 |
| JP | 2010-245010 A | 10/2010 |
| JP | 2012-209237 A | 10/2012 |
| JP | 2013-118201 | 6/2013 |
| JP | 2013-530501 A | 7/2013 |
| JP | 2013-191402 | 9/2013 |
| JP | 2014-002949 | 1/2014 |
| JP | 2014-56652 A | 3/2014 |
| TW | 201231879 | 8/2012 |
| TW | 201422973 | 6/2014 |
| WO | WO 2012/042843 | 4/2012 |
| WO | WO 2013/105169 | 7/2013 |
| WO | WO 2013/161164 | 12/2015 |

OTHER PUBLICATIONS

Extended European Search Report for European Patent Application No. 15837757.2, dated Mar. 16, 2018, 11 pages.
Official Action (with English translation) for Chinese Patent Application No. 201580039942.3, dated Dec. 28, 2018, 24 pages.
Official Action (no English translation available) for Japanese Patent Application No. 2016-546290, dated Jun. 11, 2019, 7 pages.
Official Action (with English translation) for Japanese Patent Application No. 2016-546290, dated Dec. 3, 2019, 8 pages.
Offical Action (with English translation) for Chinese Patent Application No. 201580039942.3, dated Mar. 4, 2020, 28 pages.

* cited by examiner

BULB-TYPE LIGHT SOURCE APPARATUS AND LIGHT GUIDE MEMBER

CROSS REFERENCE TO RELATED APPLICATIONS

This application is a national stage application under 35 U.S.C. 371 and claims the benefit of PCT Application No. PCT/JP2015/003872 having an international filing date of 31 Jul. 2015, which designated the United States, which PCT application claimed the benefit of Japanese Patent Application No. 2014-177701 filed 2 Sep. 2014, the disclosures of which are incorporated herein by reference in their entirety.

TECHNICAL FIELD

The present technology relates to a bulb-type light source apparatus and a light guide member used in the bulb-type light source apparatus.

BACKGROUND ART

Patent Literature 1 discloses a bulb-type LED lamp including an LED (Light Emitting Diode), a case that holds the LED, and a reflection member that covers the LED. The reflection member of Patent Literature 1 has a function of expanding light distribution of the bulb-type LED lamp by reflecting partial light from the LED toward a rear side of the case (cap side). Patent Literature 2 discloses a lighting device including a reflector having a light reflection function and a plurality of light source devices arranged so as to surround the reflector. The reflector of Patent Literature 2 also has a function of expanding light distribution by reflecting emission light toward a cap side.

There is also Patent Literature 3 below as a literature related to the present technology.

CITATION LIST

Patent Literature

Patent Literature 1: Japanese Patent Application Laid-open No. 2013-191402
Patent Literature 2: Japanese Patent Application Laid-open No. 2013-118201
Patent Literature 3: International Patent Publication No. 2013/105169

DISCLOSURE OF INVENTION

Technical Problem

As disclosed in Patent Literatures 1 and 2, there is known a method of providing a member including a light reflection function in a light source apparatus and reflecting light that has reached a front surface of the member to thus expand light distribution.

Realization of a new technology is being demanded as a technology to expand a light distribution angle of the light source apparatus.

The present technology aims at providing a bulb-type light source apparatus that realizes a wide light distribution angle and a light guide member used in the bulb-type light source apparatus.

Solution to Problem

A bulb-type light source apparatus according to the present technology includes a light source and a light guide member.

The light source is provided annularly.

The light guide member includes an outer surface, a light-incident end surface opposing the light source, and an optical pattern portion configured to emit, from the outer surface, light that enters from the light-incident end surface.

The cylindrical light guide member is capable of taking in light emitted from the light source via the light-incident end surface and converting it into light emitted from the outer surface of the light guide member. Accordingly, a wide light distribution angle can be realized.

The bulb-type light source apparatus may further include a functional component and a holding member including an outer circumferential surface having a light reflection function, the holding member being configured to hold the functional component while being arranged such that the outer circumferential surface thereof is surrounded by the light guide member.

Specifically, since the light guide member is cylindrical, other members can be arranged in a space inside the cylinder. In this case, since the holding member arranged inside the cylinder includes a reflection function, light extraction efficiency can be enhanced, and light can be caused to exit from the outer surface of the light guide member.

The light guide member may further include an inner surface, and the optical pattern portion may include an optical pattern formed on the inner surface.

The light guide member is capable of guiding light guided from the light source to the inside of the light guide member to the outer surface and causing it to exit from the outer surface using the optical pattern formed on the inner surface.

The optical pattern portion may include an optical pattern formed on the outer surface of the optical member.

The optical patterns formed on the inner surface and the outer surface are optical patterns including a light diffusion function.

The optical patterns including a light diffusion function can diffuse light totally reflected inside the light guide member and average surface luminance.

The optical pattern formed on the inner surface may include a function of varying a light reflection angle so that light exits via the outer surface.

The optical pattern formed on the inner surface may become denser as a distance from the light source increases.

An amount of light that enters the light guide member from the light-incident end surface and reaches the inner surface at a position far from the light source is smaller than that of light that reaches the inner surface at a position close to the light source. In this regard, by setting the optical pattern formed on the inner surface, which guides light to the outer surface, to become denser, the effect of averaging surface luminance can be enhanced.

The light guide member may become thinner as a distance from the light source increases.

As described above, as the position becomes farther away from the light source, the amount of light that reaches that position lessens while progressing inside the light guide member. Since the light extraction efficiency can be averaged by gradually thinning the light guide member, the effect of averaging surface luminance can be enhanced.

The light guide member may further include an end edge provided on the other side of the light-incident end surface.

Further, an outer diameter of the light guide member may become larger from the light-incident end surface toward the end edge.

Since the light guide member is formed such that it widens toward the end edge thereof, it also becomes possible to emit light from the outer surface of the light guide member toward the rear side of the bulb-type light source apparatus.

A side wall of the light guide member including the outer surface may have a curvature set such that the light-incident end surface and the end edge cannot be connected by a straight line inside the light guide member.

With this configuration, light extraction efficiency from the outer surface can be enhanced.

A light guide member according to the present technology includes the outer surface, the light-incident end surface, and the optical pattern portion described above, the light guide member being cylindrical as a whole.

Advantageous Effects of Invention

As described above, according to the present technology, a wide light distribution angle can be realized by the bulb-type light source apparatus.

It should be noted that the effects described herein are not necessarily limited, and any effect described in the specification can be obtained.

MODES FOR CARRYING OUT THE INVENTION

Hereinafter, embodiments of the present technology will be described with reference to the drawings.

[Overall Configuration of Bulb-Type Light Source Apparatus]

Figure 1:
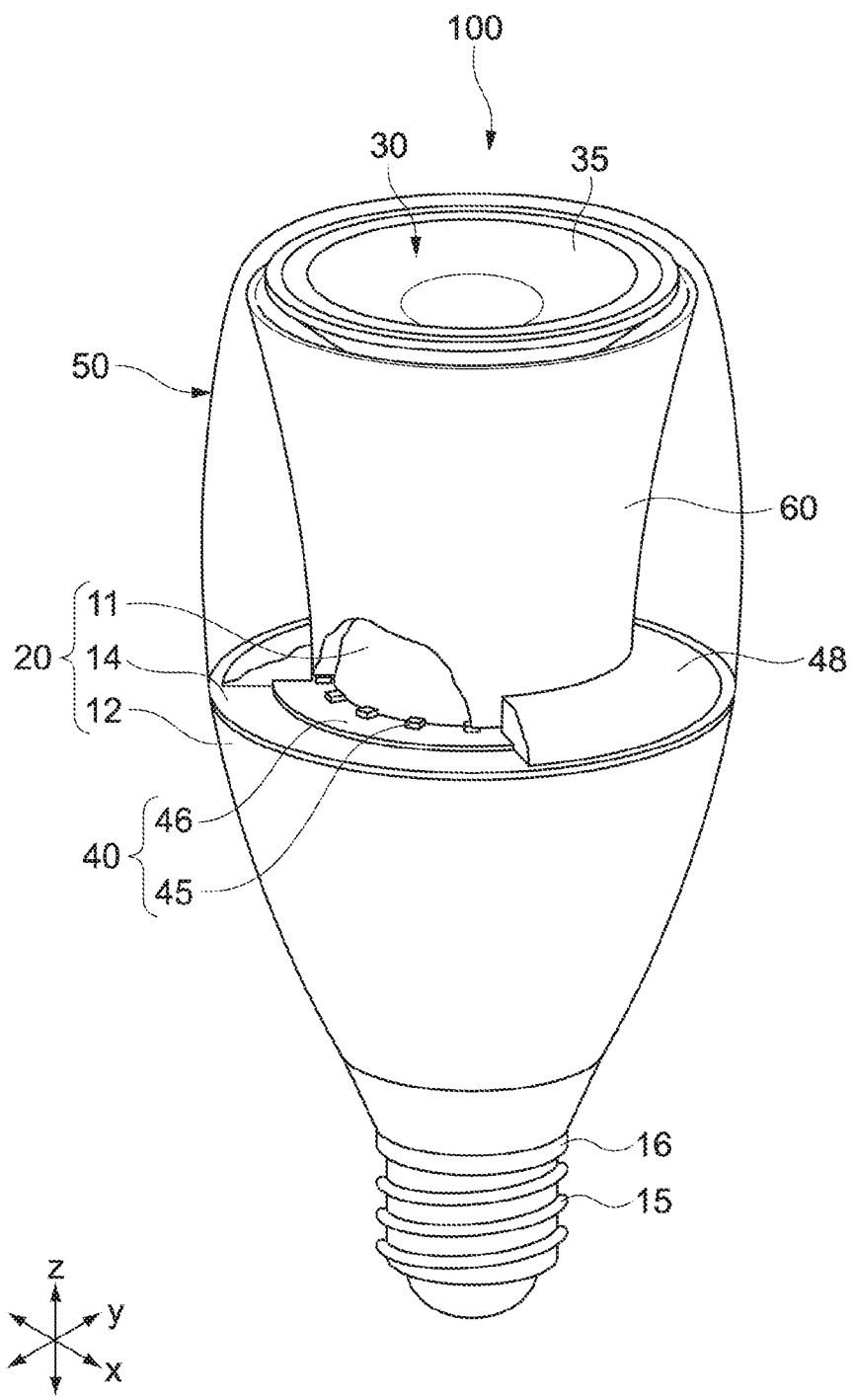
FIG. 1 is a perspective view of a bulb-type light source apparatus according to an embodiment of the present technology.
Figure 2:
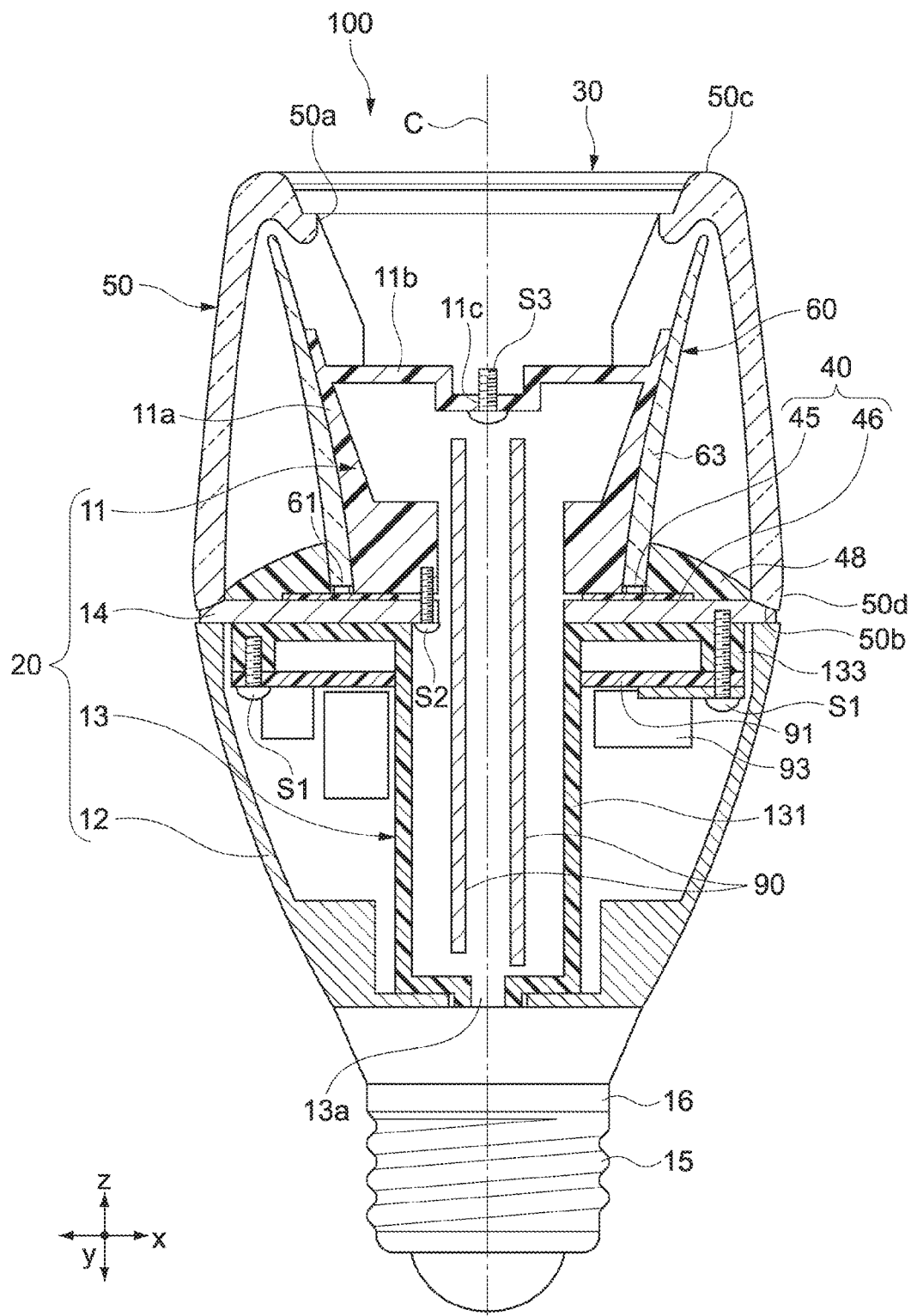
FIG. 2 is a schematic cross-sectional diagram of the bulb-type light source apparatus shown in FIG. 1.

FIG. 1 is a perspective view of a bulb-type light source apparatus according to an embodiment of the present technology. FIG. 2 is a schematic cross-sectional diagram of the bulb-type light source apparatus shown in FIG. 1. In descriptions below, the bulb-type light source apparatus will simply be referred to as light source apparatus.

A light source apparatus 100 includes a base unit 20, a light source unit (light source) 40, a speaker 30 as a functional component provided on one end side in a z-axis direction, and a translucent cover 50. The light source apparatus 100 also includes a cap 15 provided on the other end side in the z-axis direction (on the other side of speaker 30) via an electrical insulation ring 16.

For brevity of explanation, in descriptions below, a direction extending along the z axis in FIGS. 1 and 2 will be referred to as front-back direction of the light source apparatus 100. Specifically, the speaker 30 side of the light source apparatus 100 will be referred to as front, and the cap 15 side of the light source apparatus 100 will be referred to as rear.

Figure 3:
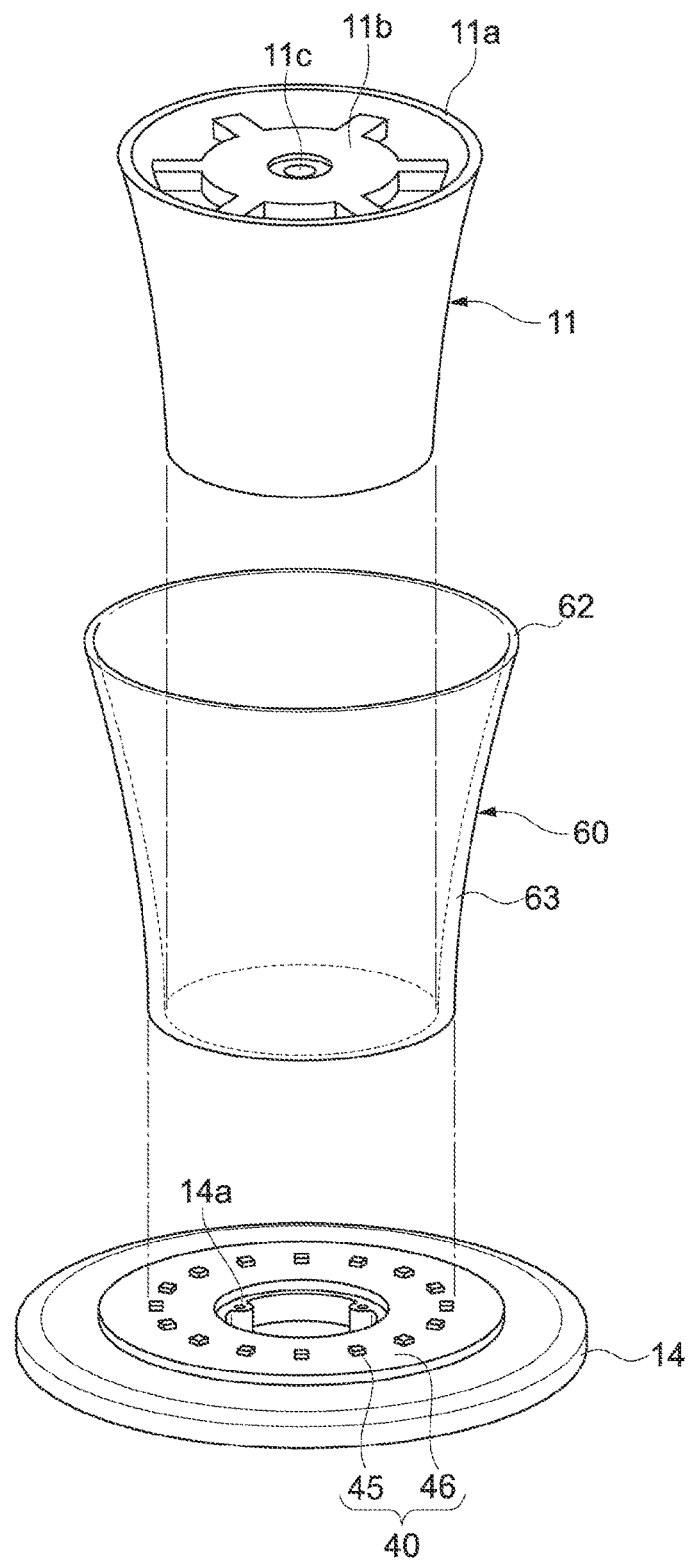
FIG. 3 is a perspective view showing each of a holding member, a light guide plate, and a light source unit.

As shown in FIG. 2, the base unit 20 includes a function of supporting at least the light source unit 40 and the translucent cover 50. Specifically, the base unit 20 includes a base casing 12 including an opening on the front side and a heatsink 14 that is provided so as to cover the opening of the base casing 12, comes into contact with the light source unit 40, and supports the translucent cover 50. The base unit 20 also includes a holding member 11 that is fixed onto the heatsink 14 and holds the speaker 30 and a substrate accommodation box 13 that accommodates various circuit substrates 90 to be described later. The base casing 12 has a high thermal conductivity and is in contact with the heatsink 14. As shown in FIG. 3, the heatsink 14 and the holding member 11 are fixed to each other by screws S2 via screw holes 14a (see FIG. 3) formed on the heatsink 14, for example.

A first opening 50a provided at a first end portion 50c on the front side and a second opening 50b provided at a second end portion 50d on the other side in the z-axis direction are formed in the translucent cover 50. The speaker 30 is attached to the translucent cover 50 such that the speaker 30 blocks the first opening 50a. The base casing 12 is connected to the second opening 50b side of the translucent cover 50 via the heatsink 14. The translucent cover 50 is formed of a material that can be injection-molded, such as acrylic and polycarbonate.

The heatsink 14 is arranged about a virtual center axis C (see FIG. 2) as an axis that passes a center of the speaker 30 along a vibration direction (z-axis direction) of a vibration plate 35 (see FIG. 1) included in the speaker 30. The heatsink 14 has a plate-like shape and is formed annularly around an entire circumference of the center axis C.

The light source unit 40 is also arranged about the center axis C as in the heatsink 14, is typically provided annularly (see FIG. 3), and is arranged on the heatsink 14. In other words, the center axis C is an axis that passes the center of the annular light source unit 40, and the heatsink 14 and the light source unit 40 are arranged concentrically.

For example, the light source unit 40 includes an annular mounting substrate 46 and a plurality of LED (Light Emitting Diode) devices 45 arranged on a circumference of the mounting substrate 46. A device that emits white light is used as each of the LED devices 45, but devices that emit a unicolor other than white or a plurality of colors may be used instead.

As shown in FIG. 2, the substrate accommodation box 13 includes a body 131 and a flange contact portion 133 provided so as to protrude from the body 131 in a direction vertical to the z axis. The plurality of circuit substrates 90 are arranged inside the body 131. The flange contact portion 133 is in contact with the heatsink 14. Specifically, an annular power supply circuit substrate 91 is mounted on and connected to the flange contact portion 133, and the flange contact portion 133 and the power supply circuit substrate 91 are connected and fixed to the heatsink 14 via a plurality of screws S1 and the like. It should be noted that a component 93 configuring a power supply circuit is mounted on the power supply circuit substrate 91.

A screw hole 13a is provided on a rear side of the body 131 of the substrate accommodation box 13. The substrate accommodation box 13 and the base casing 12 are connected and fixed to each other by a screw (not shown).

For example, a drive circuit for the light source unit 40, a drive circuit for the speaker 30, a wireless communication circuit, and the like are mounted on the plurality of circuit substrates 90.

The light source apparatus 100 includes a light guide plate 60 as a light guide member arranged opposed to the light source unit 40. The light guide plate 60 is formed cylindrically and configured to uniformly emit light from the light source unit 40 from a side surface (outer surface) thereof. By proves ding the light guide plate 60, light emitted from the LED devices 45 in dots is converted into surface-emitted light. Therefore, brightness of light from the LED devices 45 when emitted directly outside can be reduced. Details of the light guide plate 60 will be described later.

FIG. 3 is a perspective view showing each of the holding member 11, the light guide plate 60, and the light source unit 40. The holding member 11 includes a cylindrical side wall 11a and a support plate 11b that is provided inside the cylinder and supports the speaker 30. The light guide plate 60 is fixed to the holding member 11 such that the holding member 11 is fit within a side wall 63 of the light guide plate 60. As will also be described later, a shape of an outer circumferential surface 11d of the side wall 11a of the holding member 11 and that of an inner surface of the side wall 63 of the light guide plate 60 are in an approximate similarity relationship.

The outer circumferential surface 11d of the side wall 11a of the holding member 11 includes a function as a reflection surface that reflects light (light reflection function). By forming the reflection surface as a mirror surface or forming it in white, the reflection surface is given high optical reflectance.

The side wall 11a of the holding member 11 is configured to surround the plurality of circuit substrates 90 including the drive circuit for the speaker 30. With this configuration, the holding member 11 secures a space to arrange the drive circuit for driving the speaker 30 and hides the light source apparatus 100 from outside.

A screw hole 11c for fixing the speaker 30 by a screw 53 is formed on the support plate 11b.

As shown in FIGS. 1 and 2, an annular cover 48 is attached around the side wall 63 of the light guide plate 60 on the mounting substrate 46 of the light source unit 40. The cover 48 includes a function of hiding the mounting substrate 46. As in the outer circumferential surface 11d of the side wall 11a of the holding member 11, a front surface (surface on front side) of the cover 48 is configured to have high reflectance.

[Configuration of Translucent Cover]

In this embodiment, the speaker 30 is arranged in an irradiation direction of the light source unit 40. Therefore, when no measure is taken, the speaker 30 blocks light from the lit light source unit 40 and a shadow of the speaker 30 is reflected on an irradiation surface, to thus impair an illumination function. In this regard, the present technology realizes the translucent cover 50 configured as follows to secure the illumination function.

Figure 4:
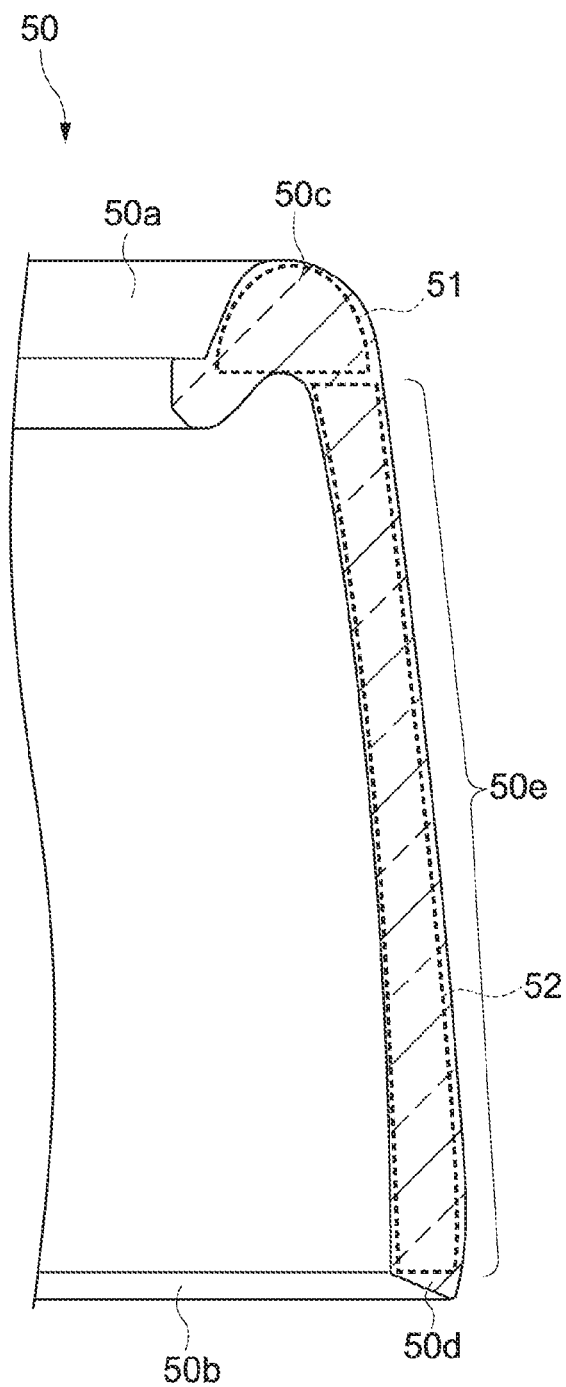
FIG. 4 is a cross-sectional diagram showing a part of a translucent cover.

FIG. 4 is a cross-sectional diagram showing a part of the translucent cover 50. The translucent cover 50 has thicknesses that differ depending on areas. The translucent cover 50 includes a first area 51 including a convex lens function and a second area 52 including a concave lens function. Of the base unit 20, the heatsink 14 supports the light source unit. 40 and the translucent cover 50 such that the second area 52 is positioned closer to the light source unit 40 than the first area 51. Specifically, the first area 51 is provided at the first end portion 50c far from the light source unit 40, and the second area 52 is provided at a side portion 50e close to the light source unit 40. The second area 52 is provided across an area between the first area 51 and the second end portion 50d.

The first area 51 and the second area 52 are each provided about the center axis C (see FIG. 2). In other words, the first area 51 and the second area 52 are provided about the speaker 30 arranged at a position that passes the center axis C.

An average thickness of the first area 51 is designed to be larger than that of the entire translucent cover 50. An average thickness of the second area 52 is designed to be smaller than that of the entire translucent cover 50.

Figure 5:
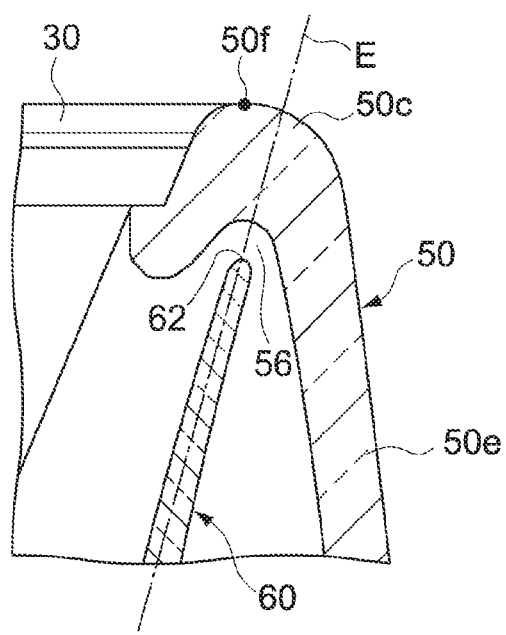
FIG. 5 is a cross-sectional diagram for explaining an arrangement relationship between the light guide plate and the translucent cover, the diagram showing a part of those members on a front side.

FIG. 5 is a cross-sectional diagram for explaining an arrangement relationship between the light guide plate 60 and the translucent cover 50, the diagram showing a part of those members on a front side. An end edge 62 of the light guide plate 60 on the other side of a side where the light source unit 40 is arranged (front side) is arranged so as to oppose the first area 51 of the translucent cover 50. For example, the translucent cover 50 includes an annular groove 56 formed by the first area 51 and the first opening 50a. The end edge 62 of the light guide plate 60 is arranged in the groove 56 while the end edge 62 is not brought into contact with the translucent cover 50.

At the first end portion 50c of the translucent cover 50, a position of an apex 50f located at the very front is deviated from a straight virtual extended line E from the end edge 62, that extends from a light-incident end surface 61 (see FIG. 2) of the light guide plate 60 toward the end edge 62 along the side wall 63 (outer surface or inner surface). Although the position of the apex 50f is deviated inwardly from the extended line E in this embodiment, the position may instead be deviated outwardly from the extended line E.

Alternatively, instead of extending from the light-incident end surface 61, the extended line E may be an extended line extending from ½ the height of the light guide plate 60 in the z direction or ⅔ the entire height in the z direction using the light-incident end surface 61 as a reference to the end edge 62, for example.

As will be described later, the light guide plate 60 includes a function of uniformly emitting surface-emitted light from the outer surface thereof. However, even when light leaks from the end edge 62, unexpected illuminance unevenness due to light leakage can be suppressed by the arrangements and configurations of the light guide plate 60 and the translucent cover 50 as described above. With such an effect, a synergetic effect with an effect obtained by the entire shape of the light guide plate as will be described later (effect described with reference to FIG. 8A) in particular can be expected.

[Configuration of Light Guide Plate]

Figure 6:
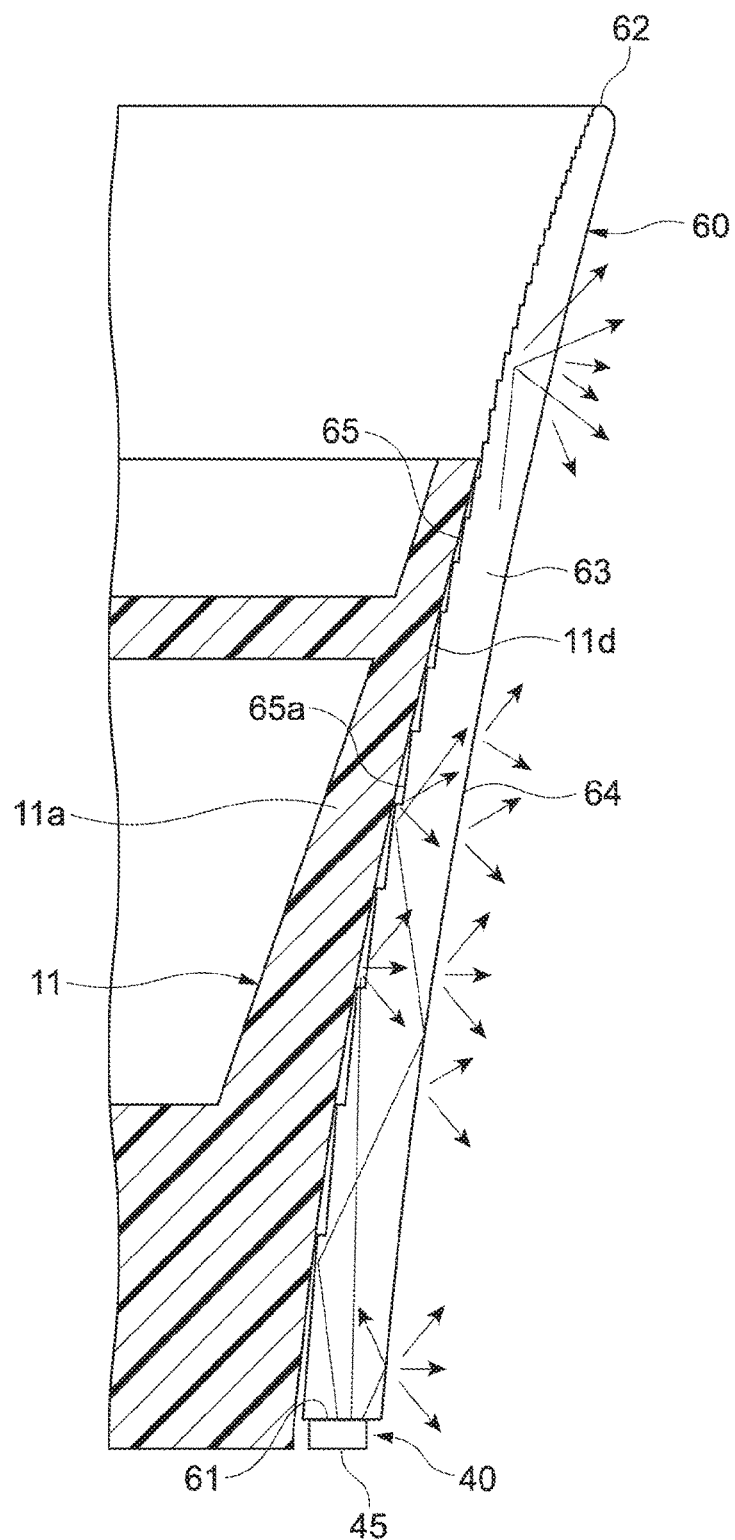
FIG. 6 is a diagram schematically showing a configuration and function of the light guide plate.

FIG. 6 is a diagram schematically showing a configuration and function of the light guide plate 60.

The entire shape of the light guide plate 60 is cylindrical with both sides in the z direction opened. The light guide plate 60 includes the side wall 63 including an outer surface 64 and an inner surface 65, the light-incident end surface 61 provided at one end thereof, and the end edge 62 provided on the other side of the light-incident end surface 61. The light guide plate 60 is arranged such that the light-incident end surface 61 opposes the plurality of LED devices 45 of the light source unit 40. With such a configuration, it is possible to guide light to be surface-emitted from the outer surface 64 and realize a wide light distribution angle.

Inner and outer diameters of the light guide plate 60, that is, the side wall 63, are set so as to widen toward the end edge 62 from the light-incident end surface 61. Further, the thickness of the light guide plate 60 is set so as to become smaller toward the end edge 62 from the light-incident end surface 61.

The light guide plate 60 is arranged so as to surround the side wall 11a of the holding member 11. As described above, the shape of the outer circumferential surface 11d of the holding member 11 and that of the inner surface 65 of the side wall 63 of the light guide plate 60 are in an approximate similarity relationship, and the inner surface 65 is provided along the outer circumferential surface 11d of the holding member 11.

As shown in FIG. 2, an area of the light guide plate 60 close to the light-incident end surface 61 is interposed between the holding member 11 as a member including a reflection function and the cover 48. Accordingly, in that area, the light guide plate 60 can cause substantially all light from the light source unit 40 to enter the light-incident end surface 61.

The side wall 63 of the light guide plate 60 includes the outer surface 64 and the inner surface 65. As shown in FIG. 6, an optical pattern portion configured to emit light that enters from the light-incident end surface 61 from the outer surface 64 is formed on the side wall 63.

The optical pattern portion is an optical pattern that includes a light diffusion function and is provided on at least one of the outer surface 64 and the inner surface 65. Alternatively, focusing on the inner surface 65, the optical pattern portion is a light guide pattern that is formed on the inner surface 65 and includes a function of varying a light reflection angle.

In this embodiment as a more-favorable mode of the present technology, an optical pattern including a light diffusion function is formed on the outer surface 64, and a light guide pattern including a function of varying a light reflection angle is formed on the inner surface 65. With such an optical pattern portion, in-place luminance can be averaged.

As the optical pattern of the inner surface 65, a stepwise light guide pattern is formed from the light-incident end surface 61 along a direction toward the end edge 62 provided on the other side. This stepwise light guide pattern is provided so as to become denser as the distance from the light source unit 40 increases. Even when a light guide pattern obtained by V-cut (concave portion having V-shaped cross section) wedge processing or the like is formed in place of the stepwise light guide pattern, an effect similar to the stepwise light guide pattern can be obtained.

The stepwise light guide pattern on the inner surface 65 is configured to vary the light reflection angle so that light is emitted toward the outside via the outer surface 64. In other words, the stepwise light guide pattern is capable of causing light that has entered at an angle different from a total reflection angle out of light that enters from the light-incident end surface 61 and proceeds while being totally reflected inside the light guide plate 60 to enter the side wall 11a of the holding member 11 or guiding the light toward the outer surface 64 at an angle at which the light can be emitted outwardly from the light guide plate 60.

The optical pattern on the inner surface 65 does not need to be stepwise and may be an optical pattern that has been subjected to serigraph, emboss processing, and the like and includes the light diffusion function described above. When forming the light guide plate 60 by injection molding, demolding becomes easy by forming the optical pattern on the inner surface 65 stepwise.

Figure 7A:
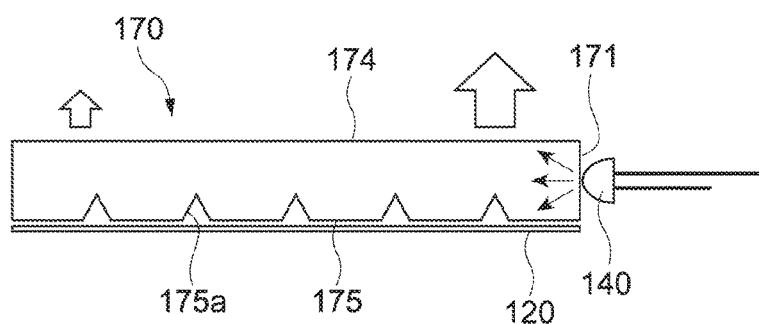
FIGS. 7A and 7B are diagrams for explaining a principle of light guide and light diffusion by an optical pattern formed on an inner surface of the light guide plate.

Here, a principle of light guide and light diffusion according to "density" of the optical pattern on the inner surface 65 will be described. As shown in FIG. 7A, light from a light source 140 that has entered a light guide plate 170 via a light-incident end surface 171 is diffused and scattered by an optical pattern 175a including a light diffusion function or a function of varying a light reflection angle, the optical pattern. 175a being formed on an inner surface 175 where a reflection plate 120 is arranged and formed by emboss processing, wedge processing, or the like (wedge processing in figure). An amount of light that enters from the light-incident end surface 171 and reaches the inner surface 175 at a position distant from the light source 140 becomes smaller than that of light that reaches the inner surface 175 at a position close to the light source 140.

Figure 7B:
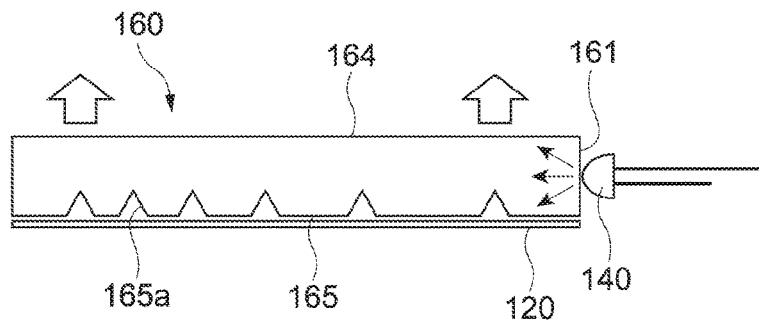

For compensating for such a light amount state, a configuration of a light guide plate 160 shown in FIG. 7B is adopted in this embodiment. Specifically, an optical pattern 165a on an inner surface 165 that guides light to an outer surface 164 becomes denser as a distance from the light source 140 increases. As a result, the effect of averaging surface luminance can be enhanced.

On the other hand, the optical pattern on the outer surface 64, that includes the light diffusion function, is an optical pattern that has been subjected to serigraph, blast processing, emboss processing, or the like. As described above, by imparting the light diffusion function also to the outer surface 64 as a light-emitting surface, the effect of averaging surface luminance can be enhanced.

The light guide plate 60 of this embodiment is set so as to become thinner as the distance from the light source increases. Since the light amount decreases as the distance from the light source increases as shown in FIG. 7A, by gradually thinning the light guide plate 60 to compensate for such a situation, light extraction efficiency can be averaged. As a result, the effect of averaging surface luminance can be enhanced.

Since the entire shape of the light guide plate 60 of this embodiment is set so as to widen toward the end edge 62, it also becomes possible to emit light toward the rear side of the light source apparatus 100. By controlling the light distribution angle as described above, a light distribution amount across the periphery of the light source apparatus 100 can be uniformized.

Figure 8A:
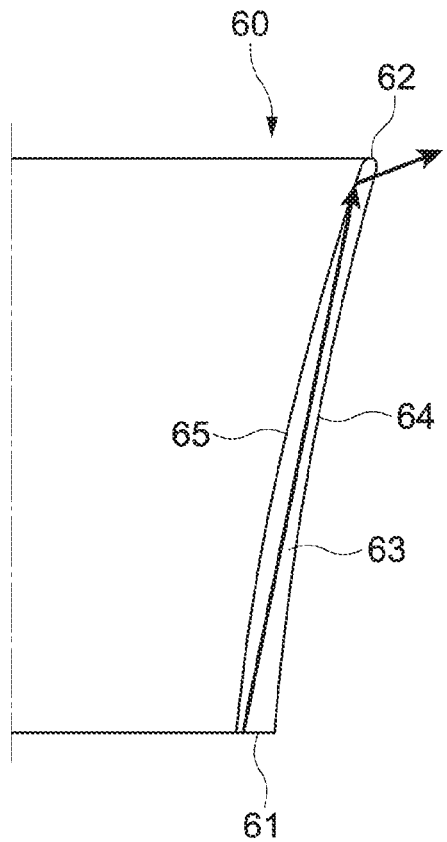
FIGS. 8A and 8B are diagrams for explaining a difference between light beams that is caused by a difference between curvatures of the light guide plate.
Figure 8B:
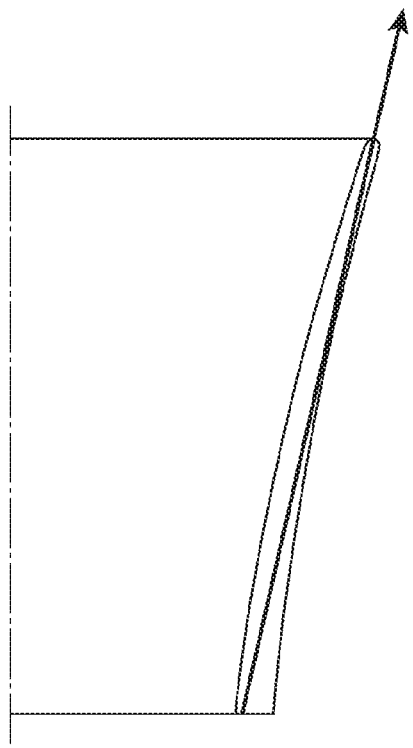

Furthermore, as shown in FIG. 8A, the side wall 63 of the light guide plate 60 has a curvature set such that the light-incident end surface 61 and the end edge 62 cannot be connected by a straight line inside the light guide plate 60. With such a configuration, it becomes possible to suppress generation of light beams linearly passing the end edge from the light-incident end surface as shown in FIG. 8B, enhance light extraction efficiency from the outer surface 64 of the light guide plate 60, and suppress unintended and unnecessary irradiation of light.

[Light Guide Plate According to Another Embodiment]

Figure 9A:
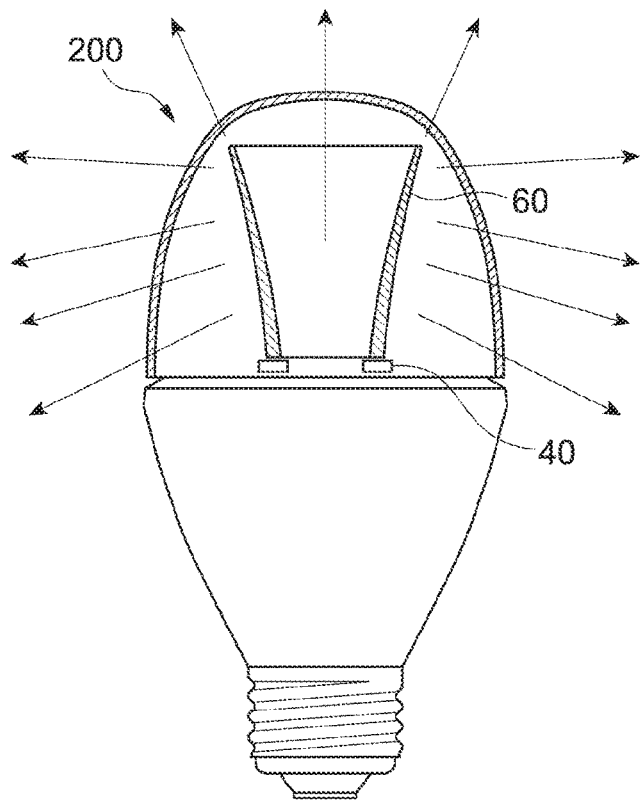
FIG. 9A is a partial cross-sectional diagram showing a bulb-type light source apparatus according to another embodiment of the present technology.

FIG. 9A is a partial cross-sectional diagram showing a bulb-type light source apparatus according to another embodiment of the present technology. The bulb-type light source apparatus 200 does not include the functional component (speaker 30) as in the embodiment above. In this way, the light guide plate 60 of this embodiment is applicable to a general bulb-type LED lighting.

Figure 9B:
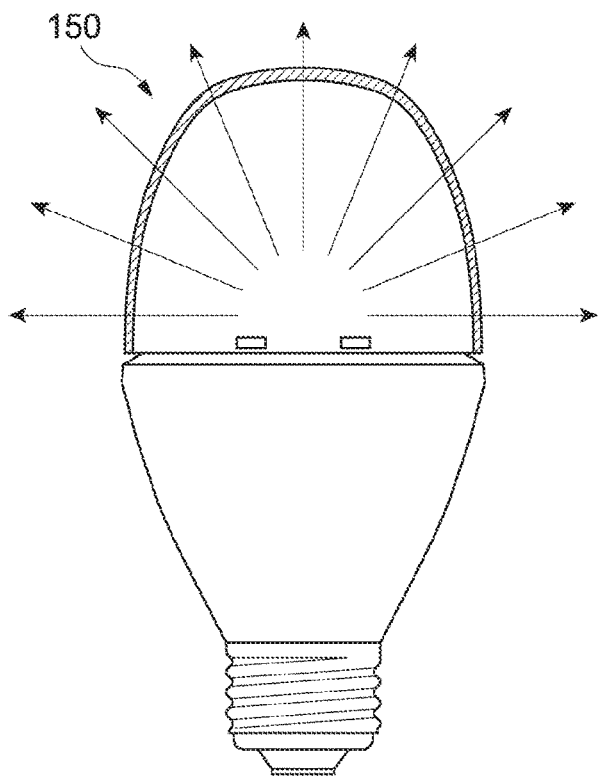
FIG. 9B is a partial cross-sectional diagram showing a general bulb-type LED lighting.

It should be noted that the light distribution angle obtained by a general bulb-type LED lighting 150 covers a range between a front side and sides as shown in FIG. 9B. In contrast, the light distribution angle of the light guide plate 60 of this embodiment covers a range between the front side and the rear side, thus realizing a wide light distribution angle.

Other Embodiments

The present technology is not limited to the embodiments above, and various other embodiments can also be realized.

The light guide plate 60 according to the embodiment above is set such that its outer diameter becomes larger as the distance from the light source increases. However, the outer diameter may be uniform in the z direction.

The light source unit 40, the heatsink 14, and the like are formed annularly, but annular shapes other than a circle may be adopted instead. Annular shapes other than a circle include a polygon including three or more sides and a circular or polygonal shape formed discontinuously in a circumferential direction, for example.

The light source apparatus of the embodiment above includes the speaker 30 as the functional component, but other functional components may be included in place of the speaker 30. Other functional components include, for example, an image sensor, an optical sensor, an ultrasonic sensor, a radiation sensor, a temperature sensor, and the like.

The light source unit includes so-called light-emitting diodes as LED devices, but devices capable of emitting surface-emitted light, such as an organic LED, may be used instead.

Of the characteristic portions of the embodiments described above, at least two of the characteristic portions can be combined.

It should be noted that the present technology can also take the following configurations.

(1) A bulb-type light source apparatus, including:
a light source provided annularly; and
a cylindrical light guide member including an outer surface, a light-incident end surface opposing the light source, and an optical pattern portion configured to emit, from the outer surface, light that enters from the light-incident end surface.

(2) The bulb-type light source apparatus according to (1), further including:
a functional component; and
a holding member including an outer circumferential surface having a light reflection function, the holding member being configured to hold the functional component while being arranged such that the outer circumferential surface thereof is surrounded by the light guide member.

(3) The bulb-type light source apparatus according to (2), in which
the light guide member further includes an inner surface, and
the optical pattern portion includes an optical pattern formed on the inner surface.

(4) The bulb-type light source apparatus according to (3), in which
the optical patters portion includes an optical pattern formed on the outer surface of the optical member.

(5) The bulb-type light source apparatus according to (4), in which
the optical patterns formed on the inner surface and the outer surface is an optical pattern including a light diffusion function.

(6) The bulb-type light source apparatus according to (3) or (4), in which
the optical pattern formed on the inner surface includes a function of varying a light reflection angle so that light exits via the outer surface.

(7) The bulb-type light source apparatus according to any one of (3) to (6), in which
the optical pattern formed on the inner surface becomes denser as a distance from the light source increases.

(8) The bulb-type light source apparatus according to any one of (2) to (7), in which
the light guide member becomes thinner as a distance from the light source increases.

(9) The bulb-type light source apparatus according to any one of (2) to (8), in which
the light guide member further includes an end edge provided on the other side of the light-incident end surface, and
an outer diameter of the light guide member becomes larger from the light-incident end surface toward the end edge.

(10) The bulb-type light source apparatus according to (9), in which
the outer surface of the light guide member has a curvature set such that the light-incident end surface and the end edge cannot be connected by a straight line inside the light guide member.

(11) The bulb-type light source apparatus according to (1), in which
the light guide member further includes an inner surface, and
the optical pattern portion includes an optical pattern formed on the inner surface.

(12) The bulb-type light source apparatus according to (11), in which
the optical pattern portion includes an optical pattern formed on the outer surface of the optical member.

(13) The bulb-type light source apparatus according to (12), in which
the optical patterns formed on the inner surface and the outer surface are optical patterns including a light diffusion function.

(14) The bulb-type light source apparatus according to (11) or (12), in which
the optical pattern formed on the inner surface includes a function of varying a light reflection angle so that light exits via the outer surface.

(15) The bulb-type light source apparatus according to any one of (11) to (14), in which
the optical pattern formed on the inner surface becomes denser as a distance from the light source increases.

(16) The bulb-type light source apparatus according to (1) or any one of (11) to (15), in which
the light guide member becomes thinner as a distance from the light source increases.

(17) The bulb-type light source apparatus according to (1) or any one of (11) to (16), in which the light guide member further includes an end edge provided on the other side of the light-incident end surface, and an outer diameter of the light guide member becomes larger from the light-incident end surface toward the end edge.

(18) The bulb-type light source apparatus according to (17), in which a side wall of the light guide member has a curvature set such that the light-incident end surface and the end edge cannot be connected by a straight line inside the light guide member.

(19) A light guide member that is cylindrical as a whole, including:

an outer surface;

a light-incident end surface capable of being arranged opposed to a light source provided annularly; and an optical pattern portion configured to emit, from the outer surface, light that enters from the light-incident end surface.

REFERENCE SIGNS LIST 11 holding member
11d outer circumferential surface
30 speaker
40 light source unit
45 LED device
60 light guide plate
61 light-incident end surface
62 end edge
63 side wall
64 outer surface
65 inner surface
100, 200 bulb-type light source apparatus

The invention claimed is:

1. A bulb-type light source apparatus, comprising:
a light source provided annularly;
a cylindrical light guide member including an outer surface and an inner surface, a light-incident end surface opposing the light source, and an optical pattern portion configured to emit, from the outer surface, light that enters from the light-incident end surface;
a functional component;
a holding member including an outer circumferential surface having a light reflection function, the holding member being configured to hold the functional component while being arranged such that a majority of the outer circumferential surface of the holding member is surrounded by the inner surface of the light guide member,
wherein the functional component is fixed to the holding member at a location that is between the light-incident end surface of the light guide member and an end edge of the light guide member that is opposite the light-incident end surface; and
a translucent cover that surrounds the light guide member and the functional component, wherein the translucent cover includes an end having an opening that is occupied by an end of the functional component,
wherein outer diameters of the light guide member and the holding member become larger in a direction from the light-incident end surface toward the end edge.

2. The bulb-type light source apparatus according to claim 1, wherein
the optical pattern portion includes a first optical pattern formed on the inner surface.

3. The bulb-type light source apparatus according to claim 2, wherein
the optical pattern portion includes a second optical pattern formed on the outer surface.

4. The bulb-type light source apparatus according to claim 3, wherein
at least one of the first and second optical patterns formed on the inner surface and the outer surface has a light diffusion function.

5. The bulb-type light source apparatus according to claim 2, wherein
the first optical pattern formed on the inner surface includes a function of varying a light reflection angle so that light exits via the outer surface.

6. The bulb-type light source apparatus according to claim 2, wherein
the first optical pattern formed on the inner surface becomes denser as a distance from the light source increases.

7. The bulb-type light source apparatus according to claim 1, wherein
the light guide member becomes thinner as a distance from the light source increases.

8. The bulb-type light source apparatus according to claim 1, wherein
a side wall of the light guide member including the outer surface has a concave shape such that the light-incident end surface and the end edge cannot be connected by a straight line inside the light guide member.

9. The bulb-type light source apparatus according to claim 1, wherein the end of the functional component extends beyond the end edge of the light guide member.

10. The bulb-type light source apparatus according to claim 9, wherein the opening and the end of the functional component are circular.

11. The bulb-type light source apparatus according to claim 1, wherein the translucent cover comprises a first portion and a second portion, wherein the first portion is convex and the second portion is concave, and wherein the first portion is closer to the functional component than the second portion.

12. The bulb-type light source apparatus according to claim 11, wherein the first portion is thicker than the second portion.

13. The bulb-type light source apparatus according to claim 12, wherein the first portion contacts at least a portion of the functional component.

14. The bulb-type light source apparatus according to claim 1, further comprising:
at least one circuit substrate that operates the functional component and the light source, wherein the holding member includes a cavity that accommodates a first portion of the at least one circuit substrate.

15. The bulb-type light source apparatus according to claim 14, further comprising:
a base fixed to the translucent cover and including a first material, wherein the translucent cover includes a second material different material from the first material type.

16. The bulb-type light source apparatus according to claim 15, further comprising:
a mounting substrate including a first surface to which the light guide member is mounted; and
a heat sink facing a second surface of the mounting substrate opposite the first surface of the mounting substrate, the heat sink being positioned between the base and the translucent cover and including an opening that accommodates a second portion of the at least one circuit substrate.

17. The bulb-type light source apparatus according to claim 16, wherein the heat sink is fixed to the holding member.

18. The bulb-type light source apparatus according to claim 16, wherein the base further comprises a substrate accommodation box configured to accommodate a third portion of the at least one circuit substrate.

19. A light guide member, comprising:
a hollow cylindrical structure including:
   a sidewall having an outer surface and an inner surface, the outer surface having a concave shape over an entire length of the cylindrical structure;
   a light-incident end surface capable of being arranged opposed to a light source provided annularly; and
   an optical pattern portion configured to emit, from the outer surface, light that enters from the light-incident end surface, wherein the optical pattern portion includes a contiguous stepwise light guide pattern along an entire length of the inner surface that becomes denser as a distance from the light source increases.

* * * * *